Sept. 23, 1947.          H. M. SCHMITT          2,427,881
MULTIPLE SELF-BALANCING METERING SYSTEM
Filed Feb. 6, 1943          2 Sheets-Sheet 1
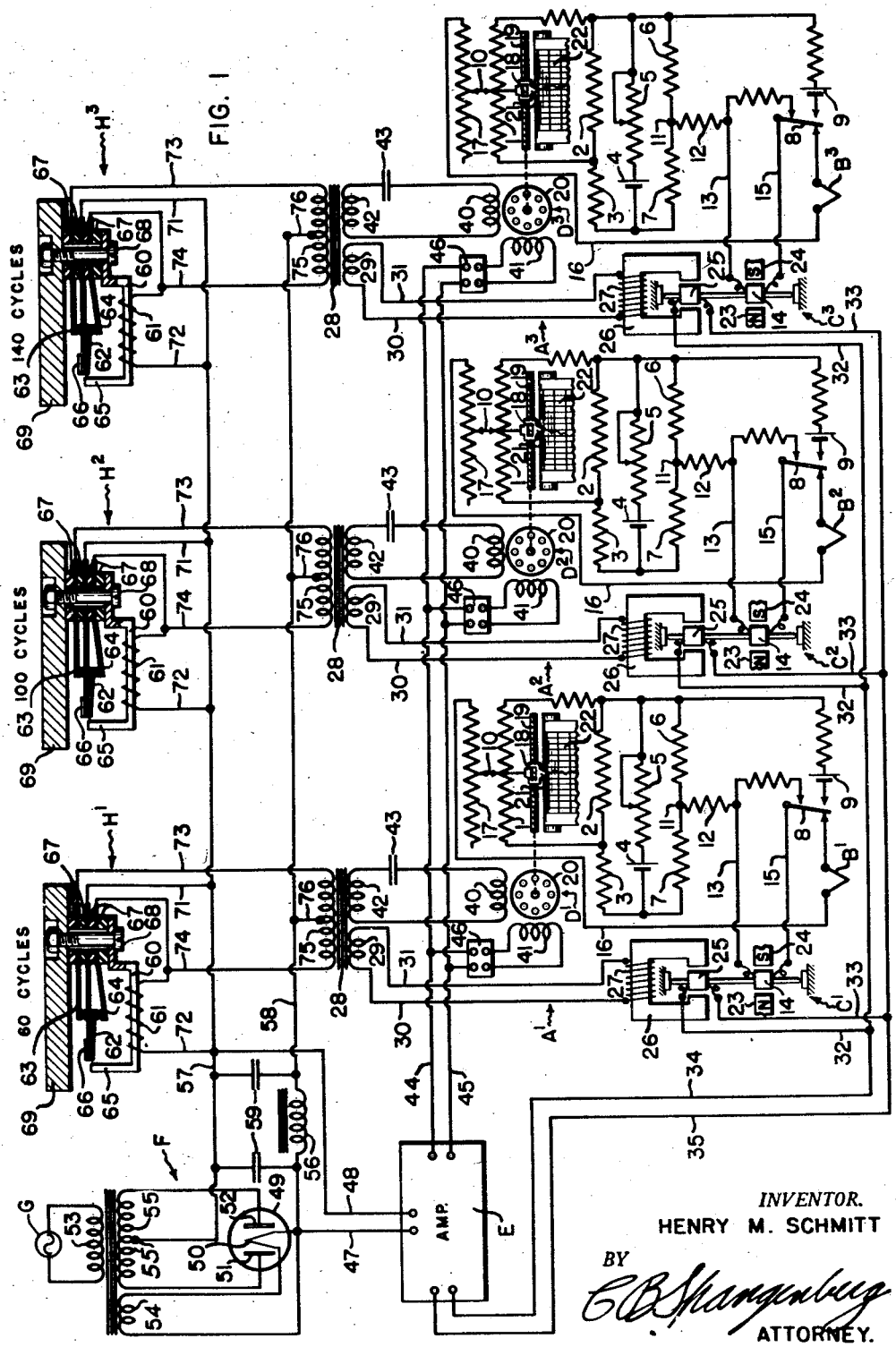
INVENTOR.
HENRY M. SCHMITT
BY
*C. B. Spangenberg*
ATTORNEY.

Sept 23, 1947. H. M. SCHMITT 2,427,881
MULTIPLE SELF-BALANCING METERING SYSTEM
Filed Feb. 6, 1943 2 Sheets-Sheet 2
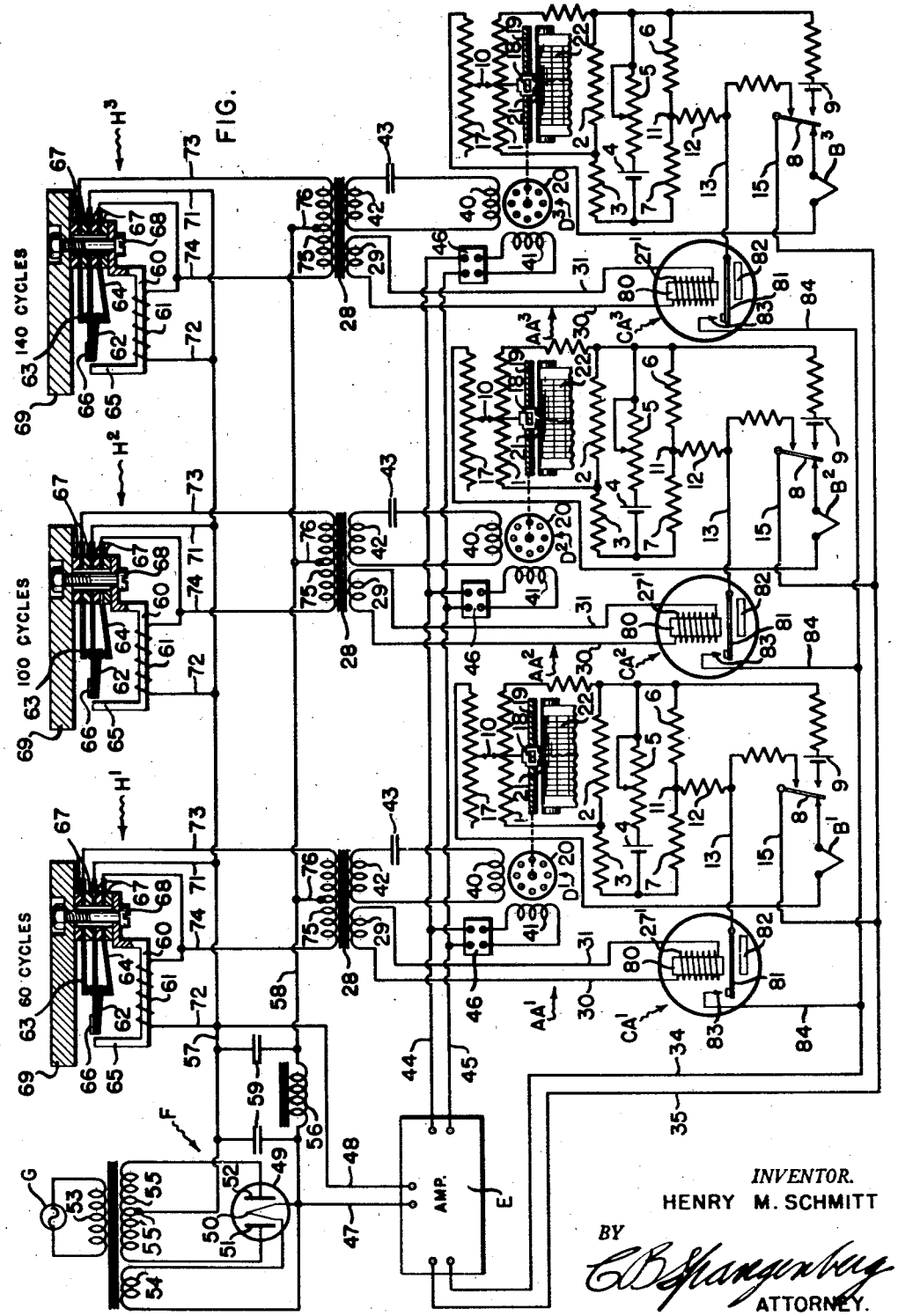
INVENTOR.
HENRY M. SCHMITT
BY
ATTORNEY.

Patented Sept. 23, 1947

2,427,881

UNITED STATES PATENT OFFICE 2,427,881

MULTIPLE SELF-BALANCING METERING SYSTEM

Henry M. Schmitt, Glenside, Pa., assignor to The Brown Instrument Company, Philadelphia, Pa., a corporation of Pennsylvania Application February 6, 1943, Serial No. 474,994

15 Claims. (Cl. 171—95)

A general object of the present invention is to provide an improved measuring system in which a plurality of measuring mechanisms, each used in measuring a particular one of different measurable conditions, are combined with other mechanism which is used in measuring each of said conditions.

The invention is of especial utility when the measurable conditions consist of or create thermocouple voltages or other relatively minute electrical quantities, and another object of the present invention is to provide simple and effective means including a single electronic control amplifier, for operating a plurality of reversible motors, each in a direction and to an extent selectively dependent on a corresponding one of a plurality of amplified control signals.

A more specific object of the invention is to provide a simple and effective combination including apparatus operating to provide a measure of each of a plurality of different measurable conditions and including a common electronic amplifier on which said apparatus impresses control signals of different predetermined frequencies each selectively dependent in magnitude and phase on the magnitude and direction of a change in a corresponding condition and including a plurality of reversible motors each operating in selective response to the amplified signals of a particular frequency.

Another specific object of the invention is to provide a novel and effective measuring system including a plurality of self-balancing measuring mechanisms, each including a rebalancing element in the form of a reversible alternating current motor and selectively operated in accordance with the phase of an alternating current which is impressed on its control winding and is of a frequency different from that of the control current impressed on the control winding of each other motor.

A preferred form of apparatus by which all of the above mentioned objects of invention may be attained, comprises a plurality of self-balancing measuring units, each of which includes a reversible rebalancing motor and is adapted to impress a control signal of a particular frequency, individual to the unit, on a common motor control system which includes an amplifier adapted to simultaneously amplify each of the control signals of different frequency, each of said motors being selectively responsive to amplified control signals of the frequency individual to the measuring unit including the motor.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a diagram illustrating apparatus for simultaneously measuring and separately recording a plurality of different temperatures; and Fig. 2 is a diagrammatic illustration of a modified form of apparatus shown in Fig. 1.

In Fig. 1 I have diagrammatically illustrated, by way of example, an embodiment of my invention comprising a plurality of measuring units $A'$, $A^2$ and $A^3$, each measuring the temperature of a corresponding thermocouple $B'$, $B^2$ or $B^3$, respectively, and each including an element $C'$, $C^2$ or $C^3$, which is responsive to variations in the voltage, and therefore in the temperature, of the corresponding thermocouple. Each of the measuring units $A'$, $A^2$ and $A^3$ includes a self-balancing potentiometric measuring means comprising a rebalancing device in the form of a reversible alternating current motor $D'$, $D^2$ or $D^3$, respectively. The motors $D'$, $D^2$ and $D^3$ are controlled through an electronic amplifier $E$ in respective response to signal voltages impressed on the amplifier by the responsive elements $C'$, $C^2$ and $C^3$. A rectifier $F$, energized by a source of alternating current $G$, supplies direct current used in energizing the amplifier $E$, and in energizing current supply devices $H'$, $H^2$ and $H^3$, respectively, included in the units $A'$, $A^2$ and $A^3$.

The function of each of the devices $H'$, $H^2$ and $H^3$ is to supply to the measuring unit including it, alternating current of a predetermined frequency which is different from the frequencies of the currents supplied by the other devices to the other units. As shown, each of the devices $H'$, $H^2$ and $H^3$, is an electro-magnetic converter which includes a circuit interruptor or vibrator and a transformer and which operates to convert direct current into alternating current of the predetermined frequency.

Each of the responsive elements $C'$, $C^2$ and $C^3$ of the different measuring units, is operatively connected to the input circuit of the amplifier $E$, and on a variation in the temperature of any one of the thermocouples $B'$, $B^2$ and $B^3$, the corresponding element $C'$, $C^2$ or $C^3$, impresses on said input circuit an alternating voltage which is of the frequency of the energizing current supplied to the corresponding unit by its energizing device H', H² or H³, and which is selectively dependent in magnitude and phase on the extent and direction of the variation in the temperature of the corresponding thermocouple.

Each of the motors D', D² and D³ includes a control winding 41, connected in the output circuit of the amplifier E, and operates in a direction and to an extent selectively dependent on the magnitude and phase condition of an alternating voltage which is of the same frequency as the energizing current supplied to the corresponding measuring unit and which is impressed on the control winding of the motor by the amplifier E. Each of the devices H', H² and H³ includes means operating as hereinafter explained, to produce unidirectional current pulsations which are passed alternately in opposite directions through the primary winding of an associated transformer 28 through which alternating energizing current of the desired frequency is supplied to the power winding 40 of the corresponding motor D', D² or D³, and to an energizing winding 27 of the corresponding responsive element C', C² or C³.

Each of the different measuring units A', A² and A³ may be, and as shown is a replica of each other unit, except as it is designed and proportioned to operate at its predetermined individual frequency. The same reference numerals are used to designate the similar parts of the different units, and the following detailed description of the unit A' will make it unnecessary to similarly describe each of the other units.

The measuring unit A' includes a potentiometric circuit network comprising a slide wire resistance 1 included in a split potentiometer bridge circuit of conventional form. As shown, said bridge circuit comprises three main branches, or of which includes resistances 2 and 3, connected in series with one another, and includes the slide wire resistance 1 which is connected in shunt to the resistance 2. A second branch of the bridge circuit includes a battery 4 and a resistor 5 which may be adjusted from time to time as required to maintain the bridge energizing current, supplied by the battery 4, at a proper value. The third main branch includes resistances 6 and 7. A calibrating switch 8 is adapted to operatively connect a standard cell 9 into the circuit from time to time to determine what adjustment of the resistance 5 may then be needed, but as the calibration operation is well known and forms no part of my invention, it need not be further described.

In its normal position, the switch 8 of the measuring unit A', connects the thermocouple B' into the detection branch of the potentiometric network of the unit, which extends between the point in the slide wire resistance 1, engaged by a sliding contact 10, and an intermediate point 11 in the circuit branch including the resistances 6 and 7. The detection circuit branch connection between said points includes a resistance 12, a conductor 13, the movable coil 14 of the element C', a conductor 15, the switch 8, the thermocouple B', a conductor 16, a resistance 17 alongside the slide wire 1 and the contact 10 which forms a bridging connection between adjacent points of the slide wire resistances 17 and 1. As those skilled in the art will recognize, the potentiometer circuit of the unit A', shown by way of example, is of well known type and is disclosed in the Harrison Patent 1,898,124, granted February 21, 1933.

The contact 10 is carried by a member 18 which comprises a nut portion in threaded engagement with a threaded shaft 19 shown as alongside the resistances 1 and 17, and directly connected to the rotor 20 of the rebalancing motor D'. As will be apparent to those skilled in the art, the operation of the motor D', effected as hereinafter described, adjusts the member 18 and thereby the contact 10 longitudinally of the shaft 19 in accordance with variations in the temperature of the thermocouple B', and may be used to produce such other control and recording effects as are customarily performed by the rebalancing mechanism of a self-balancing potentiometer. For example, and as shown, the member 18 supports a recording pen 21 which records the varying values of the temperature of the thermocouple B' on a travelling record chart 22.

The responsive element C' of the measuring unit A' is a so-called A. C.-D. C. galvanometer of known type, comprising an oscillating element which includes a coil 25 as well as the coil 14. The coil 14 forms the movable element of a D. C. galvanometer which is of the D'Arsonval type and comprises a stationary permanent magnet between the north and south poles 23 and 24 of which the coil 14 turns in a direction and to an extent dependent on the direction and magnitude of the current which flows through the coil 14 when the potentiometer is unbalanced. As will be understood, in the normal balanced condition of the potentiometer, the network point 11 and the point in the slide wire resistance 1 which is engaged by the contact 10, have potentials which differ by an amount equal in magnitude and opposite in direction to the voltage of the thermocouple B'.

The coil 25 is the so-called pickup coil of an induction device comprising a stationary core 26 having poles between which the pickup coil 25 is located. The core 26 is energized by the coil 27 through which alternating current of the predetermined frequency is supplied by the device H' through the secondary winding 29 of its transformer element 28. The winding 29 is connected to the winding 27 by conductors 30 and 31. The terminals 32 and 33 of the coil 25 are connected to the input terminals 34 and 35 of the amplifier E.

The A. C.-D. C. galvanometer is so formed and proportioned that the electro-magnetic interaction between the small coil 25 and its core 26, is without significant effect on the extent of deflection of the movable element of the galvanometer produced by a change in the voltage of the thermocouple B'. In consequence, when the potentiometer circuit of the measuring unit A' is unbalanced, the coil 25 impresses an alternating voltage on the input circuit of the amplifier E, which is dependent in magnitude and direction on the extent and direction of change in the temperature of the thermocouple B' which unbalances said circuit, and which is of the frequency predetermined by the vibrator H' as hereinafter described.

For its intended use, the motor D' may be of the form diagrammatically shown in the drawings and having its rotor 20 actuated by a rotating magnetic field set up by means comprising two pairs of oppositely disposed field poles (not shown), on one pair of which the winding 40 is wound and on the other pair of which the control winding 41 is wound. The winding 40 has its terminals connected to and supplied with energizing current by a secondary winding 42 of the previously mentioned transformer 28 through a condenser 43 of suitable value. Due to the action of the condenser 43, current which flows through the motor winding 40 will lead the voltage produced across the terminals of the transformer secondary winding 42 by approximately 90 degrees. The terminals of the motor winding 41 are connected to the output terminals 44 and 45 of the amplifier E, advantageously through a suitable filter 46.

When the potentiometer circuit of the unit A' is unbalanced by a change in the temperature of the thermocouple B', the amplifier supplies current to the coil 41, which lags or leads by approximately 90 degrees the current flow of the same frequency in the winding 40 of the motor D'. The currents flowing in windings 40 and 41 thus cooperate to establish a magnetic field acting on the rotor 20, and rotating in one direction or the other, depending upon the phase relation of the currents, and that phase relation depends in turn on whether the direction of the unbalancing change in the temperature of the thermocouple B' has deflected the movable element of the A. C.-D. C. galvanometer C' in one direction or the other.

When the motor D' is started into operation as a result of the potentiometer unbalance produced by a change in the temperature of the thermocouple B', the operation of the motor continues until it adjusts the contact 10 into position to rebalance the potentiometer circuit of the unit A'. The extent of each rebalancing operation of the motor D' is thus dependent on the magnitude of the thermocouple temperature change giving rise to the rebalancing operation.

The amplifier E, which may be of any conventional electronic type adapted to supply currents of suitable magnitudes and frequencies, comprises energizing terminals 47 and 48, in addition to its previously mentioned input terminals 34 and 35 and output terminals 44 and 45.

The rectifier F which supplies direct current for energizing the amplifier E and for energizing the devices H', H² and H³, is shown as of conventional full wave type comprising an electronic tube 49 having a filament type cathode 50 and two anodes 51 and 52 and comprising a transformer. The latter has its primary winding 53 connected to the alternating current source G and has two secondary windings 54 and 55. The secondary winding 54 supplies heating current to the filament 50. The secondary winding 55 has its end terminals connected, one to the anode 51 and the other to the anode 52 of the tube 49. The mid point 55' of the transformer secondary 55 is connected to the negative output terminal conductor 57 of the rectifier F, and the positive output terminal conductor 58 of the rectifier is connected through an inductance 56 to the filament 50. Condensers 59 connect the output terminal 57 to the terminals of the inductance 56 and in conjunction with the latter, effect a filter action tending to eliminate ripples in the unidirectional current flow between the rectifier terminals 57 and 58.

The energizing device H' in the form diagrammatically illustrated, comprises a vibrator which supplies pulsating unidirectional currents to the primary winding of the previously mentioned transformer 28 which directly supplies alternating current of predetermined frequency to the unit A'. The vibrator element of the device H' comprises an electro-magnet which includes a core 60 and a coil 61 wound on said core, a vibratory reed 62 alongside the body of the core 60 and a pair of control arms 63 and 64 between which the reed 62 is operatively disposed. The reed 62 carries suitable contacts at its opposite sides for respective engagement with contacts carried by the arms 63 and 64. The magnet core 60 has a transverse end portion 65 adjacent the free end of the reed 62 to which a block of magnetic material 66 is secured. The core 60, the reed 62 and the contact arms 63 and 64 are each supported at one end only by means of a pillar formed by the superposed end portions of the parts 60, 62, 63 and 64 and by layers 67 of insulating material, alternating with said end portions. Said pillar is provided with an axial passage through which extends a bolt 68 by which the several components of the pillar are rigidly secured together and to a supporting base 69.

As illustrated, the negative output terminal 57 of the rectifier F, is connected to the reed 62 by a conductor 71, and is also connected by a conductor 72 to one terminal of the coil 61. The contact-carrying arms 63 and 64 are connected by conductors 73 and 74, respectively, to the opposite ends of the transformer primary winding 75. The second terminal of the coil 61 is connected to the conductor 74. The positive output terminal 58 of the rectifier F is connected by a conductor 76 to the center tap of the primary winding 75 of the transformer 28.

In the arrangement described, when the cooperating contacts carried by the reed 62 and contact arm 64 are separated, current flows from the negative output terminal 57 of the rectifier F through the coil 61, the conductor 74, the left half of winding 75 and the conductor 76 to the positive output terminal 58 of the rectifier. This current flow energizes the coil 61, and the electro-magnetic core 60 then attracts the block of magnetic material 66 and deflects the reed 62 into the position in which said cooperating contacts engage. The reed 62 and contact arm 64 thus coact to then short circuit the coil 61 by connecting its second terminal to the rectifier terminal 57 through the conductor 74, arm 64, reed 62 and conductor 71. This reduces the current flow through the coil 61 so that the strength of the electro-magnet formed by the coil 61 and core 60, is no longer sufficient to overcome the spring action of the reed 62, whereupon the latter snaps out of engagement with the contact arm 64 and overswings into contact with the other contact arm 63.

When the cooperating contacts of the reed 62 and upper blade 63 are thus brought into engagement, current flows through the right half of the transformer primary winding 75 as seen in the drawing, through a circuit comprising rectifier terminal 57, conductor 71, reed 62, arm 63, conductor 73 and the second rectifier terminal 58. This current flow through the right half of the winding 75 is in a direction opposite to the preceding flow of current in the left half of the winding 75. The vibration of the reed 62 between the contact blades 63 and 64 thus results in the maintenance of an alternating magnetic flux threading the secondary windings 29 and 42 of the transformer 28.

As soon as contact between the reed 62 and the lower contact blade 64 is broken, the coil 61 is again energized so that the magnet core 60 again asserts its influence on the magnetic block 66 to move the reed 62 back into engagement with the contact blade 64, and continuous vibration of the reed 62 between the positions in which it engages the contact blades 63 and 64 is thus maintained at a rate depending upon the natural period of the several moving parts of the apparatus which are permitted to vibrate. For the purpose of the present invention, the device H' is so designed that the rate of the vibration of its reed 62 is that required to produce an alternating current having a suitable frequency suitable for the operation of the measuring unit A'. That frequency may be and is herein assumed to be 60 cycles per second.

As previously explained, each of the measuring units $A^2$ and $A^3$ includes parts similar in form and purpose to the previously mentioned parts of the unit A', and is a replica of that unit, except that in operation, the vibration frequencies of the reeds 62 of the devices $H^2$ and $H^3$ differ from one another and from the vibration frequency of the reed 62 of the device H'. When the reed vibration frequency of the device H' is adapted to establish alternating current flows of 60 cycle frequency in the secondary transformer windings 29 and 42 of the device H', the reed frequencies of the devices $H^2$ and $H^3$ may well be and are herein assumed to be such as to maintain 100 cycle frequency current flows in the secondary windings 29 and 42 of the device $H^2$ and 140 cycle current flows in the secondary windings 29 and 42 of the device $H^3$.

In the normal contemplated operation of the apparatus diagrammatically illustrated in Fig. 1, a change in the temperature of the thermocouple B' results in a deflection of the oscillating element of the A. C.-D. C. galvanometer C', in a direction and to an extent depending on the direction and magnitude of the thermocouple temperature change. When the coil 25 of the device C' is thus deflected out of its neutral position, the alternating magnetic field created by the core 26 and winding 27 of the device C' induces an alternating potential of 60 cycle frequency in the coil 25. That potential, which is impressed on the input circuit of the amplifier E, is of a magnitude dependent on the extent of the deflection of coil 25 from its neutral position and is in phase, or is 180 degrees out of phase, with the voltage induced in the transformer secondary winding 42 which is connected to and energizes the power winding 40 of the motor D'.

The 60 cycle frequency signal potential thus impressed on the input circuit of the amplifier E by the measuring unit A', results in an amplified 60 cycle voltage in the output circuit of the amplifier which creates a 60 cycle energizing current flow through the winding 41 of the motor D'. That current flow will lead or lag the current flow in the winding 40 of the motor D' by approximately 90 degrees, and the currents flowing in the two windings 40 and 41 create a rotating magnetic field which causes the rotor 20 of the motor D' to turn in a direction to adjust the bridging contact 10 of the unit A' to the left or to the right, accordingly as the preceding change in the temperature of the thermocouple B' was a decrease or an increase.

The operation of the motor D' thus initiated, continues until the adjustment of the contact 10 of the unit A' makes the potential of the latter equal to the potential of the circuit network point 11 of the unit. When the potentiometer network is thus rebalanced, the galvanometer C' is restored to its neutral position and no 60 cycle voltage is then transmitted to or amplified in the amplifier E, and the resultant interruption of 60 cycle current flow through the winding 41 of the motor D' terminates the operation of that motor until the galvanometer C' again deflects out of its neutral position.

The measuring units $A^2$ and $A^3$ produce operative results exactly like those just described on changes in the temperature of their respective thermocouples $B^2$ and $B^3$, except that a change in the temperature of the thermocouple $B^2$ impresses an alternating voltage of 100 cycle frequency on the input circuit of the amplifier E and on the control winding 41 of the motor $D^2$, while a change in the temperature of the thermocouple $B^3$ impresses an alternating potential of 140 cycle frequency on the input circuit of the amplifier E and on the control winding 41 of the motor $D^3$. Although a change in the temperature of the thermocouple of any of the units A', $A^2$ and $A^3$ causes an alternating current flow of the unit frequency in the winding 41 of each of the motors D', $D^2$ and $D^3$, that current will effectively energize only the motor D', $D^2$ or $D^3$ of the unit which includes said thermocouple, and which has its motor winding 40 energized by current of the same frequency.

The magnitude of a current of any one of the three frequencies in the winding 41 of the measuring unit supplied with energizing current of that frequency can be made substantially greater than the current of the same frequency in either of the other two windings 41, by the use of suitably designed filters 46. The filters 46 are not needed, however, to prevent any one of the motors D', $D^2$ or $D^3$ from being energized by a current flow in its winding 41 of any one of the 60, 100 and 140 cycle frequencies, except the frequency which is that of the current flow through the winding 40 of the motor. Such filters serve a useful purpose, however, in reducing the tendency of one or more of the motors to operate in response to current flow in its winding 41 of a beat frequency, which, in conjunction with the current flow through the winding 40 of the motor, might create a shifting magnetic field producing rotative movement of the motor rotor.

As those skilled in the art will understand, the apparatus illustrated diagrammatically in Fig. 1, is well adapted to attain all of the objects of the invention hereinbefore mentioned in a simple and effective manner. The general principles and advantages of the invention embodied in the apparatus shown in Fig. 1, may also be obtained with apparatus of different form. For example, the A. C.-D. C. galvanometers of each of the different measuring units A', $A^2$ and $A^3$ of Fig. 1, may be replaced by other means for impressing on the input circuit of the amplifier E an alternating or pulsating voltage of a suitable predetermined frequency and selectively dependent in magnitude and direction on the extent and direction of change in the temperature of the corresponding thermocouple or other element responsive to the condition measured by the corresponding measuring units.

Thus, the A. C.-D. C. galvanometers C', $C^2$ and $C^3$ of the units A', $A^2$ and $A^3$ of Fig. 1, may be replaced by vibrators CA', $CA^2$ and $CA^3$, respectively, as shown in Fig. 2. The vibrator CA' of Fig. 2 operates to connect the input terminals 34 and 35 of the amplifier E to the circuit branch of the measuring unit AA' which includes the thermocouple B'. The vibrator CA' comprises an electro-magnet having its core 80 surrounded by a winding 27' which may be, and as shown is, supplied with energizing current of the unit frequency by the secondary winding 29 of transformer 28 exactly as the winding 27 of the galvanometer C' shown in Fig. 1 is energized. Associated with said electro-magnet is an armature 81 polarized by an adjacent permanent magnet 82, so that the armature 81 is attracted and moved toward the core 80 during one half, and is permitted to move away from said core during the other half of each cycle of the alternating current flowing through the winding 27'. In consequence, the armature 81 vibrates with the frequency of the current flowing through the winding 27'.

In Fig. 2, the conductors 13 and 15 of the unit AA' connect the potentiometer point 11 of the unit to the armature 81 of vibrator CA', and connect the switch 8 of the unit to the amplifier input terminal 35. When the armature 81 is attracted by the electro-magnet 80 of vibrator CA' it engages a contact 83 connected by a conductor 84 to the amplifier input terminal 34. With the construction shown in Fig. 2, any change in the temperature of the thermocouple B' produces a pulsating current flow in the input circuit of the amplifier which flows in one direction or the other, depending upon whether said change is a temperature decrease or increase, and such pulsating current flow has the same frequency as the current flowing in the winding of the coil 27'. If the frequency of the current flowing through the winding 27' of the device CA' is 60 cycles per second as it may well be, a change in the temperature of the thermocouple B' will produce a 60 cycle alternating current flow in the output circuit of the amplifier E, and will thus result in an energization of the motor D' of Fig. 2, exactly as the motor D' of Fig. 1 would be energized by the same change in temperature of the thermocouple B'.

The units AA² and AA³ of Fig. 2 may be identical in construction and arrangement with the unit AA'. In consequence, if the vibrators H', H² and H³ of Fig. 2 create current flows in the primary windings 75 of the transformers 28 respectively associated with said vibrators, of 60, 100 and 140 cycles per second, respectively, the motors D', D² and D³ of Fig. 2 will be actuated to effect rebalancing operations by changes in the temperatures of the thermocouples B', B² and B³, like those effected by the apparatus shown in Fig. 1 in response to similar changes in the temperature of the thermocouples B', B² and B³ of Fig. 1.

In the arrangement shown in Fig. 2, as in that shown in Fig. 1, the magnitude of the current flow in the control winding 41 of each rebalancing motor varies as does the current flow in the detection branch of the corresponding potentiometric network, and this speeds up the larger rebalancing operations and reduces the tendency of the apparatus to hunt. In each of the two forms of the invention illustrated, the phases and frequencies of a plurality of alternating currents and voltages are characteristics of those currents and voltages utilized in a control system including a plurality of reversible alternating current motors, each having a control winding connected to the output circuit of an electronic amplifier, to cause each motor to operate in selective accordance with the phase of a signal voltage of one frequency which is impressed on the input circuit of the amplifier and which differs in frequency from a signal voltage which when impressed on said input circuit will cause another of said motors to operate in accordance with the phase of the last mentioned signal voltage.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The combination with an electronic amplifier and its input and output circuits, of means for impressing an alternating voltage of a first frequency on said input circuit, means for impressing on said input circuit an alternating voltage of a second frequency different from said first frequency, each of said means including an element adjustable to vary the phase of the voltage which that means impresses on said input circuit, a reversible alternating current motor including a rotor, a winding connected to the amplifier output circuit and a second winding, and means for impressing an alternating voltage on the last mentioned winding of the same frequency as the first mentioned voltage and in such phase relation to that voltage as to energize said motor for operation on current flow through the said winding of the motor connected to the amplifier output circuit of said first, but not of said second frequency, said motor operating when so energized in a direction selectively dependent on the phase of said voltage of the first frequency, a second reversible alternating current motor including a rotor, a winding connected to the amplifier output circuit, and a second winding and means for impressing an alternating voltage on the last mentioned winding of the same frequency as the second mentioned voltage and in such phase relation to that voltage as to energize said second motor for operation on current flow through the winding of said second motor connected to the amplifier output circuit of said second but not of said first frequency, said second motor operating when so energized in a direction selectively dependent on the phase of the second mentioned voltage.

2. The combination with an electronic amplifier and its input and output circuits, of means for impressing a first alternating voltage of one predetermined frequency on said input circuit during intermittent intervals, means for impressing on said input circuit during intermittent intervals a second alternating voltage of predetermined frequency different from the first mentioned frequency, each of said means including an element adjustable to vary the phase of the voltage which that means impresses on said first circuit, a reversible alternating current motor including a rotor, a winding connected to the amplifier output circuit and a second winding, and means for impressing an alternating voltage on the last mentioned winding of the same frequency as the first mentioned voltage and in such phase relation to that voltage as to energize said motor for operation on current flow through the said winding of the motor connected to the amplifier output circuit of said first, but not of said second frequency, said motor operating when so energized in a direction selectively dependent on the phase of said voltage of the first frequency, a second reversible alternating current motor including a rotor, a winding connected to the amplifier output circuit, and a second winding and means for impressing an alternating voltage on the last mentioned winding of the same frequency as the second mentioned voltage and in such phase relation to that voltage as to energize said second motor for operation on current flow through the winding of said second motor connected to the amplifier output circuit of said second but not of said first frequency, said second motor operating when so energized in a direction selectively dependent on the phase of the second mentioned voltage.

3. The combination with two alternating current motors each including a rotor, a control winding and a power winding, of means for controlling the operation of said motors comprising an electronic amplifier having an output circuit to which the control winding of each motor is connected and having an input circuit, means for impressing an alternating voltage of one frequency on said input circuit, means for impressing on said input circuit a second alternating voltage of a second frequency different from the first mentioned frequency, means for impressing on the power winding of one motor alternating voltage of the same frequency as, but displaced in phase from the first mentioned voltage, and means for impressing on the power winding of the other motor alternating voltage of said second frequency, but displaced in phase from the second alternating voltage.

4. The combination with an electronic amplifier and its input and output circuits, of means for impressing an alternating voltage of one frequency on said input circuit, means for impressing on said input circuit an alternating voltage of a second frequency different from said one frequency, each of said means including an element adjustable to vary the phase of the voltage which that means impresses on said input circuit through a predeterminable phase range, a reversible alternating current motor having a rotor and including a power winding and means for impressing thereon an alternating voltage of the same frequency as but displaced in phase from the first mentioned voltage and including a control winding connected to said output circuit and thereby actuated to effect operation of said motor when the first mentioned voltage is being impressed on said input circuit, a second reversible alternating current motor having a rotor and including a power winding and means for impressing thereon an alternating current of said second frequency but displaced in phase from the second mentioned voltage and including a control winding connected to said output circuit and actuated to effect operation of said second motor when current of said second frequency is impressed on said input circuit, each of said motors being operable in a direction selectively dependent on the phase relation of the currents flowing in its control and power windings.

5. The combination with an electronic amplifier and its input and output circuits, of means responsive to one variable condition and operative on a change therein to impress on said input circuit an alternating voltage which is of predetermined frequency, means responsive to a second variable condition and operative on a change therein to impress on said input circuit an alternating current voltage of predetermined frequency different from the first mentioned frequency, and two independently operable alternating current motors, each comprising a rotor, a power winding and a control winding, each control winding being connected to said output circuit, and means for independently operating said motors, comprising means for impressing on the power winding of one motor alternating voltage of the same frequency as, but displaced in phase from the first mentioned voltage, and means for impressing on the power winding of the other motor alternating voltage of said second frequency, but displaced in phase from the second mentioned alternating voltage.

6. The combination with an electronic amplifier and its input and output circuits, of means responsive to one variable condition and operative on a change therein to impress on said input circuit an alternating current voltage which is of predetermined frequency and is selectively dependent in phase on the direction of change in said condition, means responsive to a second variable condition and operative on a change therein to impress on said input circuit an alternating current voltage of predetermined frequency which is different from the first mentioned frequency and is selectively dependent in phase on the direction of change in said second condition, a reversible alternating current motor comprising a rotor, a power winding and a control winding connected to the amplifier output circuit, means for impressing an alternating voltage on said power winding of the same frequency as, but displaced in phase from the first mentioned voltage whereby said motor is set into operation by current flow in said output circuit of the first but not the second of said frequencies in a direction dependent on the first mentioned phase, and a second alternating current motor comprising a rotor, a power winding and a control winding connected to the amplifier output circuit, means for impressing an alternating current voltage on the last mentioned power winding of the same frequency as, but differing in phase from the phase of the second mentioned voltage whereby the last mentioned motor is set into operation in a direction dependent on the second mentioned phase by current flow in said output circuit of the second but not the first mentioned frequency.

7. A metering system comprising in combination, a control circuit, a plurality of self-balancing measuring instruments each measuring a quantity different from the quantity measured by each of the others and each including means for impressing on said control circuit when said instrument is unbalanced, a control voltage which is dependent in phase on the direction of instrument unbalance and is of predetermined frequency different from that impressed on said input circuit by any other instrument, a separate reversible motor for rebalancing each of said instruments, each of said motors comprising a rotor, a control winding connected to said control circuit and a power winding, and separate means associated with each motor for impressing on the power winding of that motor an alternating voltage which is of the same frequency as the voltage impressed on said control circuit by the corresponding instrument when unbalanced, and which lags or leads the voltage of the same frequency impressed on the control winding of the last mentioned motor by said control circuit according to the direction of the unbalance of the corresponding instrument.

8. A metering system comprising in combination, a plurality of self-balancing measuring instruments each measuring a quantity different from the quantity measured by each of the others, an electronic amplifier having an input circuit, means operatively associated with each instrument to impress an alternating current voltage on said input circuit when said instrument is unbalanced which is dependent in phase on the direction of unbalance and which is of predetermined frequency different from that impressed on said input circuit by any other instrument, each of said instruments including a reversible rebalancing motor comprising a rotor and two energizing windings one of which is connected to the output circuit of the amplifier, and means for impressing on the other energizing winding of each motor an alternating voltage of the same frequency as, but displaced in phase from the voltage impressed on said input circuit by the corresponding instrument when unbalanced.

9. A metering system as specified in the preceding claim 8, in which the said means operatively associated with each instrument comprises an A. C.-D. C. galvanometer.

10. A metering system as specified in the preceding claim 8, in which the said means operatively associated with each instrument comprises an electro-magnetic circuit interrupter operating at a predetermined frequency.

11. A metering system comprising in combination, a plurality of self-balancing measuring instruments each measuring a quantity different from the quantity measured by each of the others, an electronic amplifier having an input circuit, means operatively associated with each instrument to impress an alternating current voltage on said input circuit when said instrument is unbalanced which is dependent in phase on the direction of instrument unbalance and is of predetermined frequency different from that impressed on said input circuit by any other instrument, each of said instruments including a reversible rebalancing motor comprising energizing means including a rotor and two windings one of which is connected to the output circuit of the amplifier, and means for impressing on the second winding of each motor an alternating voltage which is of the same frequency as that impressed on said input circuit by the corresponding instrument when unbalanced and which lags or leads voltage of the same frequency impressed on the first mentioned winding by said output circuit according to the direction of the unbalance of said instrument.

12. A metering system comprising in combination, a control circuit, a source of current, a plurality of self-balancing measuring instruments each measuring a quantity different from the quantity measured by each of the others, means operatively associated with each instrument to impress an alternating current voltage on said control circuit when said instrument is unbalanced which is dependent in phase on the direction of instrument unbalance and which is of predetermined frequency different from that impressed on said control circuit by any other instrument, each of said instruments including a reversible rebalancing motor comprising a rotor, a power winding and a control winding, the latter being connected to said control circuit, and a plurality of converters energized by said source and separately associated with the different measuring instruments, means cooperating with each converter to supply to the power winding of the rebalancing motor of the associated instrument alternating current of a particular frequency different from the frequency of the current similarly supplied to the power winding of the rebalancing motor of any other instrument and means cooperating with said converter and the measuring means of the associated instrument on a change in the quantity measured by the latter, to supply to the control circuit of the motor of the last mentioned instrument alternating current which is of said particular frequency and which is proportional in magnitude to the said change, and which is of a phase selectively dependent on the direction of said change to thereby produce a current flow in the control winding of the last mentioned motor which lags or leads, depending on the direction of said change, the current flow of the same frequency in the power winding of the last mentioned motor.

13. A metering system comprising in combination, a source of current, a control circuit, a plurality of self-balancing measuring instruments each including measuring means for measuring a quantity different from the quantity measured by each of the other instruments and including a reversible rebalancing alternating current motor having a rotor, a power winding and a control winding, the latter being connected to said control circuit, and a plurality of converters energized by said source and separately associated with the different measuring instruments, each of said converters supplying to the power winding of the rebalancing motor of the instrument with which it is associated alternating current of a particular frequency different from the frequency of the current similarly supplied by any converter associated with another instrument and cooperating with the measuring means of the associated instrument on a change in the quantity measured by the latter to supply to said control circuit alternating current which is of said particular frequency and which is proportional in magnitude to the said change and which is of a phase selectively dependent on the direction of said change and related to the phase of the current supplied to the power winding of the motor of the associated instrument to produce a current flow in the control winding of the last mentioned motor which lags or leads, depending on the direction of said change, the current flow of the same frequency in the power winding of that motor.

14. A metering system comprising in combination, a source of direct current, an amplifier energized by said source and having an input circuit and an output circuit, a plurality of self-balancing measuring instruments each including measuring means for measuring a quantity different from the quantity measured by each of the other instruments and including a reversible rebalancing alternating current motor having a rotor, a power winding and a control winding, the latter being connected to said output circuit, and a plurality of converters energized by said source and separately associated with the different measuring instruments and each supplying to the power winding of the rebalancing motor of the instrument with which it is associated alternating current of a particular frequency different from the frequency of the current supplied by the converter associated with any other of said instruments and cooperating with the measuring means of the associated instrument on a change in the quantity measured by said instrument to produce an alternating current flow in said input circuit which is of said particular frequency and is proportional in magnitude to the said change and is of a phase related to the phase of the current supplied to the power winding of the motor of the associated instrument to produce a current flow in the control winding of the last mentioned motor which lags or leads, depending on the direction of said change, the current supplied to the power winding of that motor.

15. The combination with an electronic device having an input circuit and an output circuit, of current supply means arranged to supply at least two alternating currents each having a distinctive frequency distinguishing it from the other current, means for impressing on said input circuit at least two signalling voltages, each having a distinguishing frequency related to and resulting from the distinctive frequency of a corresponding one of said currents and each having a distinctive phase position resulting from the action of the means impressing said voltage on said input circuit, a reversible alternating current motor comprising energizing winding means coupled to said current supply means and to the output circuit of said electronic device and actuated by current flow in said output circuit created by one of said signalling voltages to effect operation of said motor in a direction selectively dependent upon said phase position of said one signalling voltage, and a second alternating current motor comprising energizing winding means coupled to said current supply means and to the output circuit of said electronic device and actuable, concurrently with the actuation of said first mentioned alternating current motor, by current flow in said output circuit created by another one of said signalling voltages in a direction selectively dependent upon said phase position of said other signalling voltage.

HENRY M. SCHMITT.

REFERENCES CITED

The following references are of record in the file of this patent:

UNITED STATES PATENTS

| Number | Name | Date |
| --- | --- | --- |
| 2,209,369 | Wills | July 30, 1940 |
| 1,931,852 | Reichel et al. | Oct. 24, 1933 |
| 1,635,779 | Carter | July 12, 1927 |
| 2,376,527 | Wills | May 22, 1945 |
| 2,256,487 | Moseley et al. | Sept. 23, 1941 |